| United States Patent [19] | [11] Patent Number: 4,767,815 |
| --- | --- |
| O'Lenick, Jr. | [45] Date of Patent: Aug. 30, 1988 |

[54] GUERBET ALCOHOL ESTERS

[75] Inventor: Anthony J. O'Lenick, Jr., Lilburn, Ga.

[73] Assignee: GAF Corporation, Wayne, N.J.

[21] Appl. No.: 118,419

[22] Filed: Nov. 9, 1987

[51] Int. Cl.$^4$ ................................................. C08K 5/11
[52] U.S. Cl. ..................... 524/317; 524/318; 524/611
[58] Field of Search ................................. 524/317, 611

[56] References Cited

U.S. PATENT DOCUMENTS

| | | |
| --- | --- | --- |
| 2,991,273 | 7/1961 | Helchelhammer et al. . |
| 2,999,835 | 9/1961 | Goldberg et al. . |
| 3,028,365 | 4/1962 | Schnell et al. . |
| 3,148,172 | 9/1964 | Fox . |
| 3,271,367 | 9/1966 | Schnell et al. . |
| 3,271,368 | 9/1966 | Goldberg et al. . |
| 3,280,078 | 10/1966 | Hostettler et al. . |
| 3,544,514 | 9/1966 | Schnell et al. . |
| 3,784,595 | 1/1974 | Schirmer et al. . |
| 4,007,150 | 2/1977 | Adelmann et al. . |
| 4,065,436 | 12/1977 | Adlemann et al. . |
| 4,081,495 | 3/1978 | Freitag et al. . |
| 4,097,435 | 6/1978 | Rawling et al. . |
| 4,111,886 | 9/1978 | Lindner et al. ...................... 524/288 |
| 4,131,575 | 12/1978 | Adelmann et al. . |
| 4,143,024 | 3/1979 | Adelmann et al. . |
| 4,408,000 | 10/1983 | Lee ....................................... 524/611 |
| 4,425,458 | 1/1984 | Lindner et al. . |
| 4,446,268 | 5/1984 | Lee ....................................... 524/611 |
| 4,487,874 | 12/1984 | Lindner .............................. 524/611 |
| 4,692,551 | 9/1987 | Liu et al. . |

FOREIGN PATENT DOCUMENTS 1516064 6/1978 United Kingdom ................ 524/317

*Primary Examiner*—John C. Bleutge
*Assistant Examiner*—David W. Woodward
*Attorney, Agent, or Firm*—Marilyn J. Maue; Joshua J. Ward

[57] ABSTRACT

The invention deals with the preparation, compositions, and application of certain high molecular weight hydrophobic ether-esters which are useful in polycarbonate processing.

5 Claims, No Drawings

GUERBET ALCOHOL ESTERS

BACKGROUND OF THE INVENTION

1. Field of the Invention

The present invention deals with the preparation, compositions, and application of certain high molecular weight hydrophobic ether-esters which are useful in polycarbonate processing.

2. Description of the Art Practices

It is known that esters of simple alcohols may be used for various purposes including polycarbonate processing. In U.S. Pat. No. 3,784,595 issued Jan. 8, 1974 to Schirmer et al polycarbonate molding compositions are shown which are based on the esters of a trihydric alcohol and a saturated aliphatic carboxylic acid. U.S. Pat. No. 4,065,436 issued to Adelmann in December 1977 describes thermoplastic molding compositions containing a mold release agent which is an ester of a saturated aliphatic carboxylic acid having from 10 to 20 carbon atoms per molecule and an aromatic hydroxy compound containing from 1 to 6 hydroxyl groups.

It is also known from U.S. Pat. No. 4,097,435 issued June 27, 1978 to Rawling et al that montanic acid ester waxes may be employed in polycarbonate molding compositions. U.S. Pat. No. 4,131,575 issued Dec. 26, 1978 to Adelmann describes in combination with aromatic polycarbonates, mold release agents which are the esters of saturated aliphatic carboxylic acids with alcohol containing from 4 to 6 hydroxyl groups. The disclosures of U.S. Pat. No. 4,131,575 are also found in the related British Pat. No. 1,490,467 published Nov. 2, 1977. U.S. Pat. No. 4,143,024 issued Mar. 6, 1979 to Adelmann et al describes aromatic polycarbonate based thermoplastic molding compositions utilizing as a mold release agent the ester of a saturated aliphatic carboxylic acid containing from 10 to 20 carbon atoms per molecule and an aromatic hydroxyl compound having 1 to 6 hydroxyl groups.

Lindner et al, U.S. Pat. No. 4,425,458, issued Jan. 10, 1984, teaches that specific guerbet alcohol diesters containing from 16 to 40 carbon atoms total in the guerbet alcohol molecule can be used as mold release agents in polycarbonate products.

General disclosures of polycarbonate technology are found in U.S. Pat. No. 4,081,495 issued Mar. 28, 1978 to Freitag et al. Similar general disclosures are also found in U.S. Pat. No. 4,007,150 issued to Adelmann et al on Feb. 8, 1977.

U.S. Pat. No. 4,692,551 issued Sept. 8, 1987 to Liu, teaches that alcohols can be reacted with butryolactone compounds like butyrolactone, methylbutryolactone, dimethylbutryolactone, ethylbutryolactone and diethylbutryolactone. Materials prepared in accordance with the teachings of U.S. Pat. No. 4,692,551 conform to the following structure:

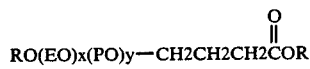

The specific alcohols used in the preparation of the ether-esters of this invention are guerbet alcohols. Since two moles of alcohol are being reacted with one of the butryolactone, early in the reaction they have an added benefit of acting as solvents for the reaction. Later at higher temperatures the second mole reacts to esterify the newly formed carboxyl group.

To the extent that each of the foregoing patents is relevant to the present invention they are herein specifically incorporated by reference. Throughout the specification and claims, percentages and ratios are by weight, pressures are gauge and temperatures are Celsius unless otherwise noted.

SUMMARY OF THE INVENTION

A polycarbonate resin composition containing an effective amount of a mold release agent which is an ether ester of a (a) guerbet alcohol and (b) a member selected from the source group consisting of butryolactone compounds like butryolactone, methylbutryolactone, dimethylbutryolactone, ethylbutryolactone and diethylbutryolactone.

DETAILED DESCRIPTION OF THE INVENTION

The present invention describes molecules that are ether-esters of a guerbet alcohol, and in particular these materials are ether-esters prepared by the reaction of a guerbet alcohol and butryolactone compounds like butryolactone, methylbutryolactone, dimethyl-butryolactone, ethylbutryolactone and diethylbutryolactone in accordance with the procedures outlined in U.S. Pat. No. 4,692,551.

The ether-esters of this invention are defined by the formula

wherein each of R, R', R" and R'" is alkyl wherein the sums of carbon atoms in R and R' and in R" and R'" are each 12 to 36 and wherein preferably the sums of carbon atoms in R and R' and in R" and R'" are each 12 to 16.

The guerbet alcohol portion of the present invention is particularly important in that polycarbonate resins have a high requirement for clarity as they are often used to form clear articles including safety glasses. Unfortunately, the polycarbonate resins tend to fail to release when molded, therefore agents must be employed to assist in releasing the polycarbonate resin from the mold. A substantial difficulty which has been found in the art is to ensure that the polycarbonate resin is not adversely affected by the mold release agent.

It will be observed in the present invention that the mold release agents of this invention result in polycarbonate products in which the clarity is not adversely affected. The ether-esters of the present invention are observed to migrate sufficiently from the polycarbonate resin to the surface of the mold to effect release. These ether-esters do not substantially sweat out or collect on the surface of the molded articles. Sweating out cause hazing which is a disadvantage for most mold release agents. Another important aspect in working with mold release agents is the volatility of the compounds. It will of course be observed that the molding process requires large amounts of heat to liquefy the polycarbonate. This turn requires low volatility of the mold release agent so that the mold release agent is not lost to the atmosphere before it can function. It is also noted that an air pollution problem within a plant may arise where a mold release agent of high volatility is utilized. The products of the present invention will be observed to have low volatility thus presenting a distinct advantage over low molecular weight materials. The ether-esters of the present invention are unexpectedly efficacious in the processing of polycarbonate because they are much more stable to high temperatures and oxidation than the diesters of Lindner et al U.S. Pat. No. (4,425,458).

Guerbet Alcohols have been known since the 1890's when Marcel Guerbet first synthesized these materials (M. Guerbet, C. R. Acad. Sci. Paris, 128, 511; 1002 (1899)). These materials are high in molecular weight and are liquid even at very low temperatures.

Guerbet alcohols are high molecular weight, hence;
(1) They have low irritation properties.
(2) They are branched, therefore they are liquid to extremely low temperatures.
(3) They have low volatility.
(4) They are primary alcohols, hence are reactive and can be used to make many derivatives.

Guerbet alcohols are essentially saturated hence;
(1) They exhibit very good oxidative stability at elevated temperatures
(2) They have excellent color initially and at elevated temperatures
(3) They exhibit improved stability over unsaturated products in many formulations.

The guerbet alcohols used in the present invention contain from about 16 to 40 carbon atoms total in the guerbet alcohol molecule. Preferably, the total number of carbon atoms in the guerbet alcohol molecule will be from 16 to 20 carbon atoms and in particular 20 carbon atoms in each guerbet alcohol.

It is known in the art that guerbet alcohols may be formed from the same or different alcohols i.e. a homo or hetro system. That is, a guerbet alcohol is the condensation product of two alcohol molecules joined at the beta carbon of the alcohol which has retained the hydroxyl functionality. The resultant product is therefore a highly branched primary alcohol containing a single hydroxyl group. It is possible to obtain mixtures of alcohols and to condense them into hetro systems. It is also possible to obtain products which are guerbet alcohols from a short chained alcohol. It is desired for reasons of polarity, compatibility with and solubility in the polycarbonate system that homo-guerbet alcohols having between 16 and 40 carbon atoms be used.

The polycarbonates with which the present ether-esters are effective mold release agents include homopolycarbonates and copolycarbonates which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxylphenyl)-sulphides, bis-(hydroxyphenyl)-ethers, bis-(hydroxylphenyl)-ketones, bis-(hydroxyphenyl)-sulphoxides, bis-(hydroxyphenyl)-sulphones and alpha, alpha-(bis(hydroxyphenyl)-diisopropyl-benzenes, as well as their nuclear alkylated and nuclear-halogenated compounds. These are further suitable aromatic dihydroxy compounds are described, for example, in U.S. Pat. Nos. 3,028,365, 2,999,835, 3,148,172, 3,271,368, 2,991,273, 3,271,367, 3,280,078, 3,014,891 and 2,999,846, in German Offenlegungsschriften (German Published Specifications) Nos. 1,570,703, 2,063,050, 2,063,052, 2,211,956, and 2,211,957, in French Patent Specification No. 1,561,518 and in the monograph "H. Schnell, Chemistry and Physics of Polycarbonates, Interscience Publishers, New York, 1964".

Preferred bisphenols are those of the formula I shown below:

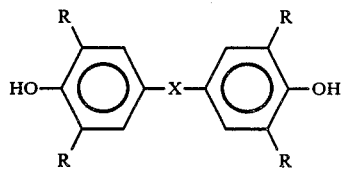

in which R is identical or different and denotes H, $C_1$-alkyl, Cl or Br, and in which X is a bond, $C_1C_8$-alkylene, $C_2$-alkylidene, $C_5$–$C_{15}$cycloalkylene, $C_5$–$C_{15}$-cycloalkylidene, —SO— or formula II shown below:

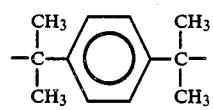

Examples of these bisphenols are 4,4'-dihydroxydiphenyl, 2,2-bis-(4-hydroxyphenyl)-propane, 2,4-bis(4-hydroxyphenyl)-2-methylbutane, 1,1-bis-(4-hydroxyphenyl)-cyclohexane, a,a-bis(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-propane, bis(3,5)-dimethyl-4-hydroxyphenyl)-2-methylbutane, 1,1-bis-(3,5-dimethyl-4-hydroxyphenyl)-cyclohexane, a,a-bis-(3,5-dimethyl-4-hydroxyphenyl)-p-diisopropyl-benzen e, 2,2-bis-(3,5-dichloro-4-hydroxyphenyl)-propane and 2,2-bis(3,5-dibromo-4-hydroxyphenyl)-propane.

Examples of particularly preferred bisphenols are: 2,2-bis-(4-hydroxyphenyl)-propane, 2,2-bis(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, and 1,1-bis-(4-hydroxyphenyl)-cyclohexane.

Preferred aromatic polycarbonates are those which are based on one or more of the bisphenols mentioned as being preferred. Particularly preferred copolycarbonates are those based on 2,2-bis-(4hydroxyphenyl)-propane and one of the other bisphenols mentioned as being particularly preferred. Further particularly preferred polycarbonates are those based solely on 2,2-bis-(4-hydroxyphenyl)-propane or 2,2-bis-(3,5-dimethyl-4-hydroxyphenyl)-propane.

The aromatic polycarbonates can be prepared in accordance with know processes, such as, for example, in accordance with the melt trans-esterification process from bisphenols and diphenyl carbonate and the two-phase boundary process from bisphenols and phosgene, as described in the above mentioned literature.

The aromatic high-molecular weight polycarbonates can be branched due to the incorporation of small amounts, preferably of between 0.05 and 2.0 mol % (relative to diphenols employed), of trifunctional or more than trifunctional compounds, especially compounds with three of more phenolic hydroxyl groups.

Polycarbonates of this type are described, for example, in German Offenlegungsschriften (German Published Specifications) Nos. 1,570,533, 1,595,762, 2,116,974 and 2,113,347; British Patent Specification No. 1,079,821; U.S. Pat. No. 3,544,514 and German Patent Application No. P25 00 092.4.

Some examples of compounds with three or more than three phenolic hydroxyl groups which can be used are phloroglucinol, 4,6-dimethyl-2,4,6-tri-(4,hydroxyphenyl)-heptane-2, 4,6-dimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-Phenol, 2,6-bis-(2-hydrox-5-methylbenzyl)-4-methylphenol, 2-(4-hydroxyphenol), 2,2,4dihydroxyphenyl)propane, hexa(4-(4-hydroxyphenylisopropyl)phenyl)orthoterephthalic acid ester, tetra-(4-hydroxyphenyl)-methane and 1,4-bis-((4',4''-dihydroxytriphenyl)methyl)-benzene. Some of the other trifunctional compounds are 2,4-dihydroxybenzoic acid, trimesic acid, cyanuric chloride and 3,3-bis-(4-hydroxyphyenyl)-2oxo-2,3-dihydroindole.

The aromatic high-molecular polycarbonates should as a rule have mean weight-average molecular weights $\bar{M}$ of at least 10,000; especially of 10,000 to 200,000; preferably of 20,000 to 80000; determined by measuring the relative viscosity in $CH_2Cl_2$ at 25 degrees C. and a concentration of 0.5% by weight.

The thermoplastic polycarbonate molding compositions find use in several areas. Such examples of use for the polycarbonates of the present invention utilizing the mold release agents include the electrical industry and the optical field such as the stripping of sockets, coiled bodies, complicated housings, projector housings, switch cabinet bottoms and other similar applications.

The mold release agent of the present invention (the ether ester) is utilized with the polycarbonate in the manner of similar prior polycarbonate formulations. The level of use of the ether-ester to the polycarbonate is from about 0.025% to about 1.0%; preferably from about 0.1% to about 0.25% by weight of the total polycarbonate compositions.

EXAMPLES OF GUERBET ALCOHOL

The following examples are offered as illustrative of the various methods available for making guerbet alcohols.

EXAMPLE 1

To 967 grams of decyl alcohol in a suitable reaction flask, add 30.0 grams of sodium hydroxide and 2.0 grams of nickel, under good agitation. Heat material to between 230 and 250 degrees C. The water generated from the reaction will be removed.

Reaction progress is followed by GLC analysis. The amount of $C_{20}$ guerbet will exceed 90%. The reaction product is then distilled to give a high purity guerbet.

EXAMPLE 2

To 510 grams of decyl alcohol and 510 grams of lauryl alcohol in a suitable reaction flask, add 20.0 grams of potassium hydroxide and 1.0 grams of zinc, under good agitation. Heat material to between 230 and 250 C. The water generated from the reaction is distilled off.

Reaction progress is followed by GLC analysis. The guerbet obtained will exceed 90%. The reaction product is then distilled to give a high purity guerbet.

EXAMPLE 3

To 500 grams of decyl alcohol and 500 grams of octyl alcohol in a suitable reaction flask, add 30.0 grams of potassium hydroxide and 2.0 grams of nickel, under good agitation. Heat material to between 230 and 250 degrees C. The water generated from the reaction is removed.

Reaction progress is followed by GLC analysis. The guerbet obtained will exceed 90%. The reaction product is then distilled to give the commercial mixed guerbet.

EXAMPLE 4

To 1000 grams of octyl alcohol in a suitable reaction flask, add 30.0 grams of potassium carbonate and 1.0 grams of nickel, under good agitation. Heat material to 220 to 240 C. The water generated from the reaction will be distilled off.

Reaction progress is followed by GLC analysis. The yield of $C_{16}$ guerbet alcohol will exceed 90%. The reaction product is then distilled to give the commercial guerbet.

EXAMPLE 5

To 967 grams of isodecyl alcohol and 500 tridecyl alcohol in a suitable reaction flask, add 30.0 grams of sodium hydroxide and 2.0 grams of copper chromite, under good agitation. Heat material to between 230 and 250 C. The water generated from the reaction is removed by distillation.

Reaction progress is followed by GLC analysis. The guerbet yield will exceed 90%. The reaction is then distilled to give the commercial guerbet.

Materials are also commercially available from Coneda Chime, Henkel Corporation and Exxon Chemicals.

The following are suggested embodiments of present invention.

EXAMPLE I

To a suitable reaction vessel is added 596.0 grams of the guerbet alcohol (example 1). Next, 56.1 grams of potassium hydroxide is added. The reaction mass is then heated to 100–120 C. Then, 86.0 grams of n-butyrolactone is added. Reaction temperature is held between 100 and 120 C. for four to six hours. The reaction mass is cooled to ambient temperature and washed with dilute aqueous hydrochloric acid to remove potassium chloride. The aqueous layer is discarded. Subsequently, the organic phase is washed two times and the pH is 3–4. After discarding the aqueous phase and adding 2.0 grams of a suitable esterification catalyst, the temperature is increased to 160–200 C. and water begins to distill off. Vacuum is applied to keep the water distilling off. When 97% of the theoretical water is removed the reaction is cooled. The desired product is obtained in 97% purity.

EXAMPLE II

To a suitable reaction vessel is added 652.0 grams of the guerbet alcohol (example 2). Next, 56.1 grams of potassium hydroxide is added. The reaction mass is then heated to 100–120 C. 86.0 grams of n-butyrolactone is added. Reaction temperature is held between 100 and 120 C. for four to six hours. The reaction mass is cooled to ambient temperature and washed with aqueous hydrochloric acid to remove potassium chloride. The aqueous layer is discarded. Subsequently, the organic phase is washed two times and the pH is 3–4. After discarding the aqueous phase and adding 2.0 grams of a suitable esterification catalyst, the temperature is increased to 160–200 C. and water begins to distill off.

Vacuum is applied to keep the water distilling off. When 97% of the theoretical water is removed the reaction is cooled. The desired product is obtained in 97% purity.

EXAMPLE III

To a suitable reaction vessel is added 538.0 grams of the guerbet alcohol (example 3). Next, 56.1 grams of potassium hydroxide is added. The reaction mass is then heated to 100–120 C. Next, 86.0 grams of n-butyrolactone is added. Reaction temperature is held between 100 and 120 C. for four to six hours. The reaction mass is cooled to ambient temperature and washed with aqueous hydrochloric acid to remove potassium chloride. The aqueous layer is discarded. Subsequently, the organic phase is washed two times and the pH is 3–4. After discarding the aqueous phase and adding 2.0 grams of a suitable esterification catalyst, the temperature is increased to 160–200 C. and water begins to distill off. Vacuum is applied to keep the water distilling off. When 97% of the theoretical water is removed the reaction is cooled. The desired product is obtained in 97% purity.

EXAMPLE IV

A suggested utilization of the ether-ester of Examples 1–4 is conducted by using 0.12% by weight of the ether-ester, and following the general procedure given at Column 6 of U.S. Pat. No. 4,065,436.

By so following the general teachings of the aforementioned reference it will observed that the various ether-esters of the guerbet alcohols of the present invention give polycarbonates of high clarity and low volatility.

What is claimed is:

1. A polycarbonate resin composition containing an effective mold releasing amount of an ether-ester derived from the reaction of (a) a guerbet alcohol having from 16 to 40 carbon atoms with (b) a butyrolactone selected from the group consisting of butyrolactone, methylbutyrolactone, dimethylbutyrolactone, ethylbutyrolactone and diethylbutyrolactone.

2. The composition of claim 1 wherein said ether-ester has the formula

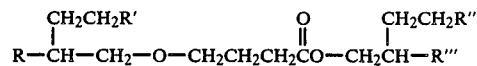

wherein each of R, R', R", and R'" is alkyl and wherein the sum of carbon atoms in R and R' and the sum of carbon atoms in R" and R'" are each 12 to 36.

3. The composition of claim 2 wherein the sum of carbon atoms in R and R' and the sum of carbon atoms in R" and R'" are each 12 to 16.

4. The composition of claim 1 containing from about 0.025% to about 1.0% by weight of the ether-ester.

5. The composition of claim 4 containing from about 0.1% to about 0.25% by weight of the ether-ester.

* * * * *